(12) United States Patent  
Takahashi et al.

(10) Patent No.: US 12,424,012 B2  
(45) Date of Patent: Sep. 23, 2025

(54) INFORMATION PROCESSING APPARATUS

(71) Applicant: FUJIFILM Business Innovation Corp., Tokyo (JP)

(72) Inventors: Naomi Takahashi, Kanagawa (JP); Junichi Shimizu, Kanagawa (JP); Shintaro Adachi, Kanagawa (JP); Akinobu Yamaguchi, Kanagawa (JP); Kunihiko Kobayashi, Kanagawa (JP); Shinya Nakamura, Kanagawa (JP); Masanori Yoshizuka, Kanagawa (JP); Akane Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 522 days.

(21) Appl. No.: 17/701,677

(22) Filed: Mar. 23, 2022

(65) Prior Publication Data

US 2023/0108505 A1  Apr. 6, 2023

(30) Foreign Application Priority Data

Sep. 24, 2021 (JP) .................. 2021-156133

(51) Int. Cl.
*G06V 30/412* (2022.01)
*G06F 40/177* (2020.01)
(Continued)

(52) U.S. Cl.
CPC .......... *G06V 30/412* (2022.01); *G06F 40/177* (2020.01); *G06V 30/413* (2022.01); *G06V 30/416* (2022.01)

(58) Field of Classification Search
CPC .. G06V 30/412; G06V 30/413; G06V 30/416; G06F 40/177
See application file for complete search history.

(56) References Cited

U.S. PATENT DOCUMENTS

| 2009/0106299 A1* | 4/2009 | Furusho | G06F 7/32 |
| | | | 707/999.102 |
| 2010/0332470 A1* | 12/2010 | Farkash | G06F 16/80 |
| | | | 707/706 |
| 2011/0164813 A1* | 7/2011 | Enomoto | G06F 40/177 |
| | | | 382/164 |

FOREIGN PATENT DOCUMENTS

JP  2020-155054  9/2020

OTHER PUBLICATIONS

"Notice of Reasons for Refusal of Japan Counterpart Application", issued on May 7, 2025, with English translation thereof, pp. 1-5.

* cited by examiner

*Primary Examiner* — Iriana Cruz

(74) *Attorney, Agent, or Firm* — JCIPRNET

(57) ABSTRACT

An information processing apparatus includes a processor configured to: extract a table group including a first table and at least one second table from plural tables formed as images, the first table and the at least one second table having a common characteristic in terms of a table structure, the first table including a heading row representing attributes of attribute values included in the first table and the at least one second table, the at least one second table not including the heading row; relate the first table and the at least one second table included in the table group to each other so that the first table and the at least one second table are arranged in consecutive order, by using attribute values of an attribute which is included in the heading row and which represents consecutiveness of the first table and the at least one second table; and obtain attribute values corresponding to each of the attributes included in the heading row from a table sequence, the table sequence including the first table and the at least one second table arranged in consecutive order.

10 Claims, 10 Drawing Sheets

(51) Int. Cl.
*G06V 30/413* (2022.01)
*G06V 30/416* (2022.01)

FIG. 2A

| | | | | |
|---|---|---|---|---|
| 8 | Product H | 2 | 20,000 | 40,000 |
| 9 | Product I | 3 | 40,000 | 120,000 |
| 10 | Product J | 2 | 5,500 | 11,000 |
| 11 | Product K | 1 | 5,000 | 5,000 |
| 12 | Product L | 2 | 2,000 | 4,000 |
| 13 | Product M | 1 | 15,000 | 15,000 |
| 14 | Product N | 2 | 35,000 | 70,000 |

FIG. 2B

| | | | | |
|---|---|---|---|---|
| 15 | Product O | 1 | 8,800 | 8,800 |
| 16 | Product P | 2 | 13,500 | 27,000 |
| 17 | Product Q | 2 | 600 | 1,200 |
| 18 | Product R | 1 | 3,400 | 3,400 |
| 19 | Product S | 2 | 900 | 1,800 |
| 20 | Product T | 1 | 17,500 | 17,500 |
| 21 | Product U | 1 | 6,300 | 6,300 |

FIG. 2C

| | | | | |
|---|---|---|---|---|
| 22 | Product V | 1 | 1,100 | 1,100 |
| 23 | Product W | 1 | 9,000 | 9,000 |
| | | | Grand Total | 566,000 |

TABLE 1

| Group Name | Number of Members | Average Age |
|---|---|---|
| Group A | 10 | 34.5 |
| Group B | 8 | 31.8 |

FIG. 11

| No. | Product Name | Quantity | Unit Price | Total |
|---|---|---|---|---|
| 1 | Product A | 1 | 100,000 | 100,000 |
| 2 | Product B | 1 | 2,300 | 2,300 |
| 3 | Product C | 2 | 8,600 | 17,200 |
| 4 | Product D | 1 | 10,000 | 10,000 |
| 5 | Product E | 2 | 1,200 | 2,400 |
| 6 | Product F | 1 | 65,000 | 65,000 |
| 7 | Product G | 1 | 28,000 | 28,000 |

| 8 | Product H | 2 | 20,000 | 40,000 |
|---|---|---|---|---|
| 9 | Product I | 3 | 40,000 | 120,000 |
| 10 | Product J | 2 | 5,500 | 11,000 |
| 11 | Product K | 1 | 5,000 | 5,000 |
| 12 | Product L | 2 | 2,000 | 4,000 |
| 13 | Product M | 1 | 15,000 | 15,000 |
| 14 | Product N | 2 | 35,000 | 70,000 |

| 15 | Product O | 1 | 8,800 | 8,800 |
|---|---|---|---|---|
| 16 | Product P | 2 | 13,500 | 27,000 |
| 17 | Product Q | 2 | 600 | 1,200 |
| 18 | Product R | 1 | 3,400 | 3,400 |
| 19 | Product S | 2 | 900 | 1,800 |
| 20 | Product T | 1 | 17,500 | 17,500 |
| 21 | Product U | 1 | 6,300 | 6,300 |

| 22 | Product V | 1 | 1,100 | 1,100 |
|---|---|---|---|---|
| 23 | Product W | 1 | 9,000 | 9,000 |
| | | | Grand Total | 566,000 |

INFORMATION PROCESSING APPARATUS

CROSS-REFERENCE TO RELATED APPLICATIONS

This application is based on and claims priority under 35 USC 119 from Japanese Patent Application No. 2021-156133 filed Sep. 24, 2021.

BACKGROUND

(i) Technical Field

The present disclosure relates to an information processing apparatus.

(ii) Related Art

Japanese Unexamined Patent Application Publication No. 2020-155054 discloses a table information reading device. The table information reading device includes a document input unit, a table structure estimator, and a table element relationship determiner. The document input unit receives input of document information and extracts table configuration information included in the document information. The table configuration information indicates the configuration of a table. Based on the table configuration information, the table structure estimator estimates table structure information indicating the association between each cell forming the table and its element type, that is, whether each cell is a header element, a content filling element, or another element. The table element relationship determiner determines the relationship between information included in the header element and that in the content filling element, based on the relationship between the positions of cells grouped into the header element in the table and the positions of cells grouped into the content filling element in the table.

SUMMARY

When a single table does not fit on one page and is divided into multiple tables with a page break, a heading row indicating attributes of the content of the table is included only in a divided heading table and not in the other tables following the heading table. If different types of multiple tables are divided and each of the divided tables is formed on one page of a sheet, the following situation may occur. If the sheets including these divided tables are imaged with an optical device, such as a scanner, in the state in which the sheets are not arranged as in the dividing order of the tables, it may not be clear which tables form the same type of table.

To deal with such a situation, in the related art, the structures of divided tables, such as the number of columns, column width, row width, border type, background color, and font type, are first checked. Then, from the divided tables having the same structure, a single table constituted by these tables is constructed, and attribute values corresponding to each attribute included in the heading row are extracted from the divided tables.

With this approach of the related art, however, the order of the divided tables is not known from the structure of the divided tables, and it is not guaranteed that the tables constructed by relating the divided tables having the same structure are arranged in the same order as that of the single original table constituted by these divided tables.

Aspects of non-limiting embodiments of the present disclosure relate to an information processing apparatus in which, even if multiple tables include a table without a heading row which represents attributes of attribute values indicated in the multiple tables, the multiple tables can be arranged in order, and then, the attribute values of each attribute included in the heading row can be obtained from the table without the heading row.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: extract a table group including a first table and at least one second table from plural tables formed as images, the first table and the at least one second table having a common characteristic in terms of a table structure, the first table including a heading row representing attributes of attribute values included in the first table and the at least one second table, the at least one second table not including the heading row; relate the first table and the at least one second table included in the table group to each other so that the first table and the at least one second table are arranged in consecutive order, by using attribute values of an attribute which is included in the heading row and which represents consecutiveness of the first table and the at least one second table; and obtain attribute values corresponding to each of the attributes included in the heading row from a table sequence, the table sequence including the first table and the at least one second table arranged in consecutive order.

BRIEF DESCRIPTION OF THE DRAWINGS

Exemplary embodiments of the present disclosure will be described in detail based on the following figures, wherein:

FIGS. 2A through 2C illustrate examples of following tables which follow the heading table in FIG. 1;

FIG. 11 illustrates examples of tables divided within the same page.

DETAILED DESCRIPTION

Figure 1:
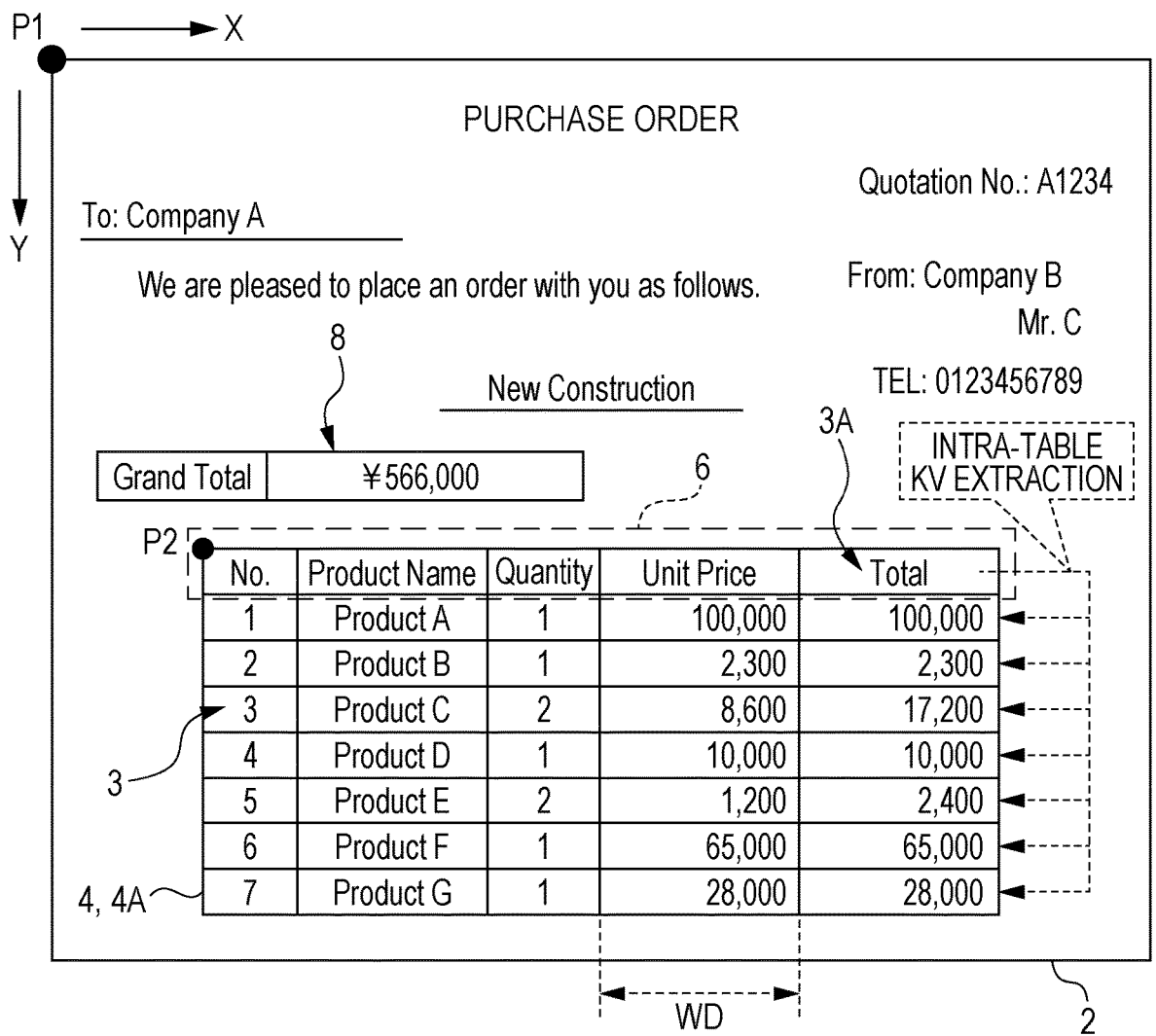
FIG. 1 illustrates an example of a heading table.

Exemplary embodiments of the disclosure will be described below with reference to the accompanying drawings. The same element will be designated by like reference numeral, and the same operation will be designated by like step number throughout the drawings, and an explanation thereof will not be repeated.

Images 2 are generated as a result of optically reading a document including tables 4 formed on recording mediums, such as sheets. An information processing apparatus 10 according to the exemplary embodiments obtains from the images 2 attribute values corresponding to each attribute included in a heading row 6 of the tables 4.

FIG. 1 illustrates an example of a document formed as an image 2 received by the information processing apparatus 10. A document to be received by the information processing apparatus 10 is of any type of document, such as a purchase order sheet, an invoice, a quotation, a contract sheet, a design drawing, and an assembly diagram, as long as the image 2 of the document includes a table 4. The document formed as the image 2 may include other drawings and diagrams, such as figures and photos, as well as the table 4.

"Attribute" is an item to be used for identifying information to be obtained from the image 2. An attribute value corresponding to an attribute is the content of the attribute represented by one or plural characters included in the image 2.

The relationship between the attribute and the attribute values in the table 4 will be explained below by taking the image 2 of a purchase order sheet shown in FIG. 1 as an example. "No.", "Product Name", "Quantity", "Unit Price", and "Total" indicated in the heading row 6 of the table 4 represent items for identifying information indicated in the table 4 and are thus examples of the attributes in the table 4. While each attribute of the table 4 is indicated in a cell 3 in the heading row 6, characters filled in cells 3 in the other rows arranged in the column direction of the table 4 represent attribute values of the corresponding attribute. For example, for the attribute "Total" indicated in a cell 3A, "100,000", "2,300", "17,200", "10,000", "2,400", "65,000", and "28,000" in the cells 3 arranged in the column direction of the table 4 represent specific values of the attribute "Total" and are thus examples of attribute values of the attribute "Total".

"Cells 3" are individual regions divided by gridlines in the table 4. However, the cells 3 may not necessarily be separated from each other by gridlines in the table 4. Even without gridlines in the table 4, if characters are arranged in a state in which the association between rows and columns can be uniquely identified, the position of one or plural characters is recognized as a cell 3 in the table 4.

The information processing apparatus 10 defines a two-dimensional coordinate system for an image 2 by using a specific position within the image 2 as an origin P1, and represents a position within the image 2 by the coordinate values of the two-dimensional coordinate system. In the image 2 of the purchase order sheet in FIG. 1, the vertex on the top left of the image 2 is set to be the origin P1, and the X axis is set along the horizontal direction of the image 2, while the Y axis is set along the vertical direction of the image 2. In the exemplary embodiments, the row direction of the table 4 is the X-axis direction of the two-dimensional coordinate system, while the column direction of the table 4 is the Y-axis direction of the two-dimensional coordinate system.

The information processing apparatus 10 determines the position of each column of the table 4 within the image 2 in accordance with the two-dimensional coordinate system. The position of a column is represented by the X coordinate value of the gridline separating this column from another column, for example. In the table 4 shown in FIG. 1, the position of a column is represented by the X coordinate value of a vertex P2 on the top left of a corresponding cell 3 in the heading row 6 of the table 4. In FIG. 1 and FIGS. 2A, 2B, 2C, and 11, which will be discussed later, the position of a column is indicated only for the leftmost column as a typical example.

The table 4 shown in FIG. 1 is a portion of a single table 4 which is divided with a page break because of the layout or the reason that the single table 4 does not fit on one page.

FIGS. 2A through 2C illustrate examples of tables 4 which follow the table 4 shown in FIG. 1. It is assumed that the four tables 4 shown in FIGS. 1 through 2C form a single table 4. That is, the tables 4 shown in FIGS. 1 through 2C are generated by dividing the single table 4 and are thus called divided tables 4.

As discussed above, a user does not necessarily create a document so that a single table 4 can fit on one page. The information processing apparatus 10 may thus receive images 2 including divided tables 4 distributed over multiple pages (four pages in the example in FIGS. 1 through 2C).

The heading row 6 is located on the first row of the single table 4. Unless a user intentionally inserts the heading row 6 on the first row of each of the divided tables 4 following the table 4 in FIG. 1, the tables 4 in FIGS. 2A through 2C do not contain the heading row 6.

For the sake of description, hereinafter, a table 4 including a heading row 6, such as that in FIG. 1, will be called a heading table 4A or a table 4A, while a table 4 without a heading row 6, such as those shown in FIGS. 2A through 2C, will be called a following table 4B or a table 4B. The heading table 4A and the following table 4B will be simply called tables 4 unless it is necessary to distinguish them from each other. The heading table 4A is an example of a first table according to the exemplary embodiments, while the following table 4B is an example of a second table according to the exemplary embodiments.

An image 2 may include information representing a total for at least one attribute, such as the total price and the quantity included in a heading row 6. The attribute values of such an attribute can be added to each other. In the example of the tables 4 shown in FIGS. 1 through 2C, the grand total price is indicated by the item name "Grand Total" in a region 8 in FIG. 1, and the grand total price is also indicated by the item name "Grand Total" in a cell 3B in the table 4B in FIG. 2C.

Figure 3:
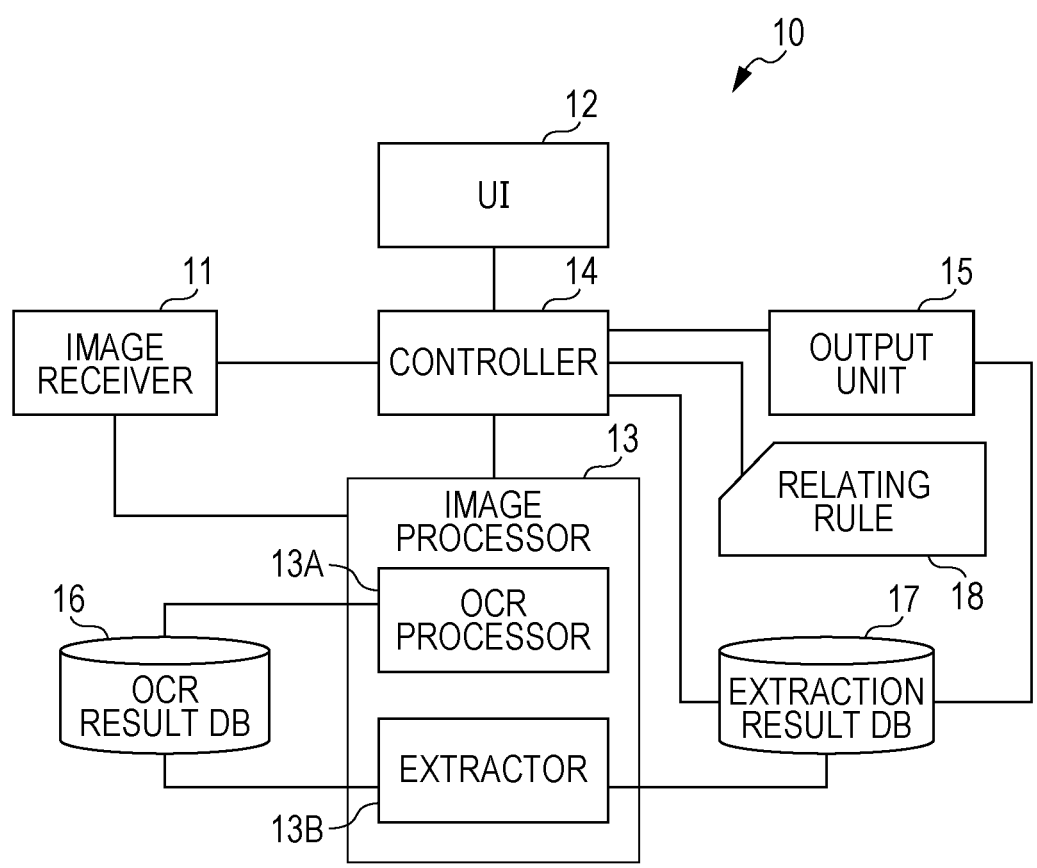
FIG. 3 is a block diagram illustrating an example of the functional configuration of an information processing apparatus.

FIG. 3 is a block diagram illustrating an example of the functional configuration of the information processing apparatus 10 according to the exemplary embodiments. The information processing apparatus 10 includes function units: an image receiver 11, a user interface (UI) 12, an image processor 13, a controller 14, and an output unit 15; storage regions: an optical character recognition (OCR) result database (DB) 16 and an extraction result DB 17; and a relating rule 18.

An optical device (not shown), such as a scanner, optically reads the content of a document including tables 4 and generates images 2 of the document. The image receiver 11 receives the images 2 including the tables 4 from the optical device and sends the received images 2 to the image processor 13. Among the images 2 received by the image receiver 11, there are an image 2 including a table 4 which fits on one page and images 2 including divided tables 4 distributed over multiple pages. The images 2 received by the image receiver 11 may not necessarily be arranged in page order. In some images 2, pages may be arranged out of order, a page may be missing, or a page of a document which is not related to a document from which attribute values are to be extracted may be mixed. For example, the correct order of the images 2 including the tables 4 shown in FIGS. 1 through 2C is the image 2 in FIG. 1, that in FIG. 2A, that in FIG. 2B, and that in FIG. 2C. If, however, a purchase order sheet whose pages are not arranged in order is read by a scanner, the image receiver 11 may receive the images 2 in order of the image 2 in FIG. 1, that in FIG. 2B, that in FIG. 2A, and that in FIG. 2C.

The UI 12 receives an instruction, such as an instruction to start receiving images 2 using the image receiver 11, from a user who intends to obtain the attribute values of attributes in the tables 4 of the images 2 by using the information processing apparatus 10. The UI 12 also supplies various items of information, such as the operation and the state of the information processing apparatus 10, to a user.

The image processor 13 executes processing for extracting character information from the images 2 received by the image receiver 11 and also for extracting the attribute values corresponding to a predetermined attribute in the tables 4 from the extracted character information. To execute this processing, the image processor 13 includes an OCR processor 13A and an extractor 13B.

The OCR processor 13A performs known image recognition processing for the received images 2 so as to convert portions of the images 2 corresponding to the characters into character codes. That is, as a result of executing processing by the OCR processor 13A, the portions of the images 2 corresponding to the characters can be handled as character information, which makes it possible to copy the characters and to search for the characters.

The OCR processor 13A also recognizes the gridlines of a table 4 so as to identify the structure of the table 4. If a table 4 does not contain gridlines, the OCR processor 13A may identify the structure of the table 4 by using certain characteristics regarding how the characters are arranged in the table 4, such as the characters are arranged along the row direction and the column direction in a lattice form.

The structure of a table 4 is the external-appearance characteristics, such as the number of columns, column width, row width, border type, positions of columns, background color of cells 3, and font type and size of characters in the cells 3. To identify the structure of a table 4, a known recognition method, such as that disclosed in Japanese Unexamined Patent Application Publication No. 2020-155054, for example, may be used. Information representing the structure of a table 4 will be called the structure information of a table 4.

Hereinafter, the character information and the structure information of a table 4 obtained from an image 2 by the OCR processor 13A will be called OCR results. The OCR processor 13A stores the OCR results in the OCR result DB 16.

The extractor 13B checks the OCR results stored in the OCR result DB 16, extracts all the tables 4 included in the images 2 received by the image receiver 11, and groups tables 4 having common characteristics in terms of the structure of the tables 4 together. In one example, the extractor 13B checks the width WD (see FIG. 1) of each column in each of the extracted tables 4 and groups tables 4 having the same width WD together as tables 4 having common characteristics in terms of the structure of the tables 4. The extractor 13B may group tables 4 having common characteristics together, based on a combination of the width WD of the column and another item of the structure information of the tables 4.

Tables 4 obtained by dividing the same table 4 tend to have the same structure. It is thus more likely that divided tables 4 having common characteristics in terms of the structure of the tables 4 form the same table 4 than divided tables 4 which do not have common characteristics. A set of divided tables 4 that are likely to form the same table 4 will be called a table group.

A table group of a single table 4 which is not divided includes only this table 4. In the case of divided tables 4, a single table 4 constituted by these divided tables 4 includes a heading row 6 only at the head of this table 4. A table group constituted by divided tables 4 thus includes one heading table 4A and at least one following table 4B.

The extractor 13B stores the individual table groups in the extraction result DB 17.

After the image processor 13 has sorted the tables 4 included in the images 2 into table groups, the controller 14 performs control so that the individual tables 4 included in the same table group are related to each other in accordance with a predetermined rule set in the relating rule 18.

The relating rule 18 is a rule that defines how to relate the individual tables 4 included in the same table group.

The relating rule 18 includes at least one of the following relating rules: a rule for relating individual tables 4 in a table group to each other so that they become consecutive (hereinafter called the consecutiveness rule); and a rule for relating individual tables 4 in a table group to each other so that they become consistent (hereinafter called the consistency rule).

"Consecutiveness" of tables 4 refers to a state in which divided tables 4 are arranged in consecutive order. "Consistency" of tables 4 refers to a state in which a combination of divided tables 4 reflects the content of a single table 4 constituted by these divided tables 4 (which may also be called an original table 4) without any excess or shortage.

If the consecutiveness rule is set in the relating rule 18, the controller 14 relates the individual tables 4 in a table group to each other so that the tables 4 are arranged in the same order as the original table 4. If the consistency rule is set in the relating rule 18, the controller 14 relates the individual tables 4 in a table group to each other after checking that the content of the original table 4 is reflected in the tables 4 obtained by relating the individual tables 4 in the table group to each other without any excess or shortage. In one example, relating individual tables 4 to each other includes a mode in which divided tables 4 are combined with each other so as to satisfy the relating rule 18.

In this manner, when a following table 4B is related to a table 4A including a heading row 6, the attribute values corresponding to each attribute included in the heading row 6 of the table 4A are arranged along the column direction of the tables 4. It is thus possible to obtain the association between the content (attribute value) of each cell 3 in the following table 4B without the heading row 6 and the attribute in the heading row 6. That is, by relating the individual tables 4 in a table group to each other in accordance with the relating rule 18 so that the related tables 4 have at least one of the consecutiveness and the consistency, the controller 14 associates the heading row 6 included in the heading table 4A to each following table 4B in a virtual manner.

From the tables 4 related to each other so as to have at least one of the consecutiveness and the consistency, the controller 14 obtains the attribute values for each attribute included in the heading row 6.

To obtain the attribute values for each attribute of the table 4, "intra-table KV extraction", for example, is used. "Intra-table KV extraction" is a technique of extracting attribute values for each attribute included in the heading row 6 page by page. "KV" stands for Key-Value. "Key" is a character string representing an attribute in an image 2, while "value" is a character string representing an attribute value for an attribute. A character string may include one or plural characters.

For example, as a result of performing intra-table KV extraction for the image 2 of the purchase order sheet shown in FIG. 1, for the attribute "Total", "100,000", "2,300", "17,200", "10,000", "2,400", "65,000", and "28,000" arranged in the column direction of the table 4A are extracted from the table 4A as the attribute values of the attribute "Total".

To perform intra-table KV extraction, the heading row 6 is required to specify the association between the content (attribute value) of a cell 3 in the table 4A and the attribute.

It would not be possible to extract, from a following table 4B without a heading row 6, attribute values corresponding to each attribute of a table 4 by performing intra-table KV extraction. As discussed above, however, the information processing apparatus 10 according to the exemplary embodiments can associate a heading row 6 with each following table 4B in a virtual manner. As a result of relating the tables 4 in a table group to each other so as to have at least one of the consecutiveness and the consistency, the information processing apparatus 10 is able to obtain the attribute values for each attribute included in the heading row 6 even from the following tables 4B.

The controller 14 stores the attribute values obtained from the individual tables 4, which are related to each other so as to have at least one of the consecutiveness and the consistency, in the extraction result DB 17 in association with the attributes included in the heading row 6.

Specific processing executed by the information processing apparatus 10 for relating tables 4 to each other in accordance with the relating rule 18 will be discussed later in detail.

In response to an instruction from the controller 14, the output unit 15 obtains the attribute values, which are extracted from the images 2 for each attribute of the original table 4 by the controller 14, from the extraction result DB 17, and outputs the obtained attribute values.

Outputting the attribute values for each attribute of a table 4 is to enable a user to check the attribute values for each attribute of the table 4. From this point of view, sending the attribute values for each attribute of the table 4 to an external device via a communication network, displaying the attribute values on a display, printing the attribute values on a recording medium, such as a sheet, using an image forming device, and storing the attribute values in a storage device that a user is authorized to access are all output examples of the attribute values for each attribute of the table 4.

Figure 4:
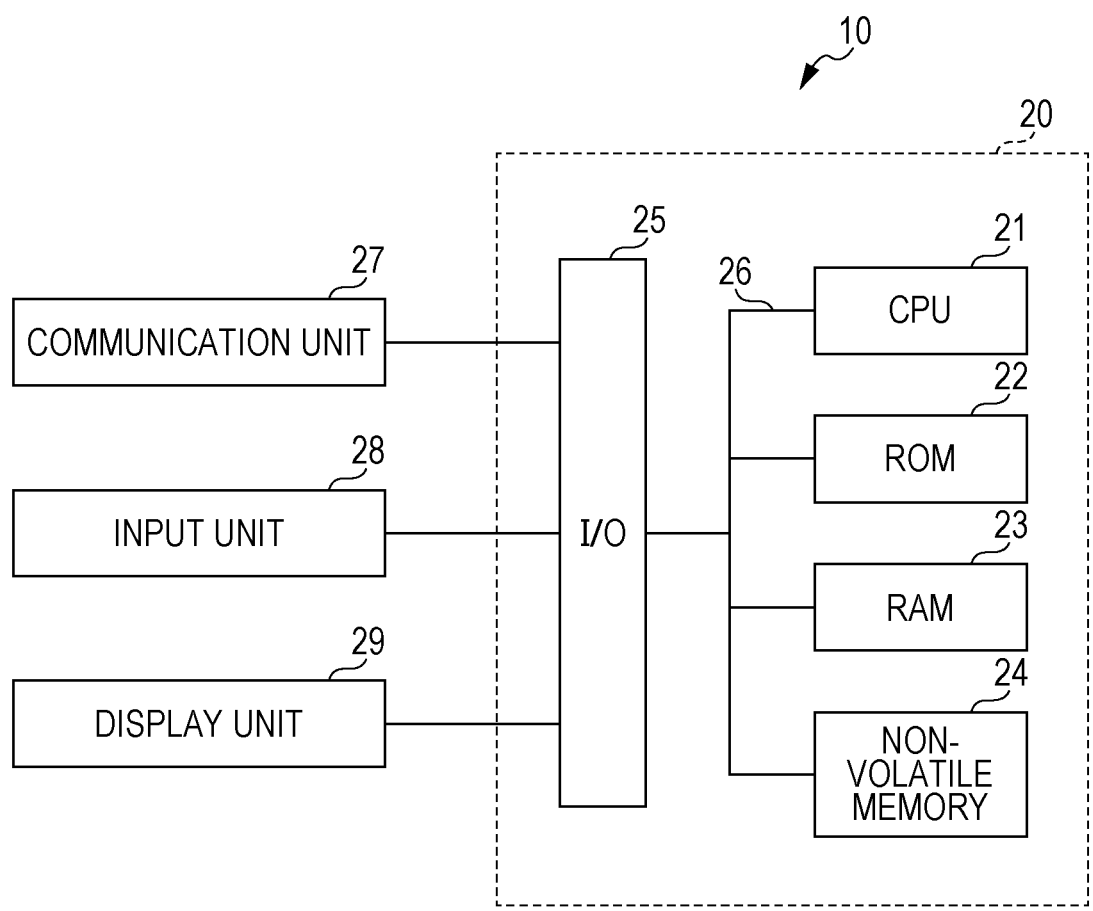
FIG. 4 is a block diagram illustrating examples of major elements of the electrical system of the information processing apparatus constituted by a computer.

The information processing apparatus 10 shown in FIG. 3 is constituted by a computer 20, for example. FIG. 4 is a block diagram illustrating examples of major elements of the electrical system of the information processing apparatus 10 constituted by the computer 20.

The computer 20 includes a central processing unit (CPU) 21, a read only memory (ROM) 22, a random access memory (RAM) 23, a non-volatile memory 24, and an input/output (I/O) interface 25. The CPU 21 serves as the individual functions of the information processing apparatus 10 shown in FIG. 3. The ROM 22 stores an information processing program executed by the CPU 21. The RAM 23 is used as a work area for the CPU 21. The CPU 21, the ROM 22, the RAM 23, the non-volatile memory 24, and the I/O interface 25 are connected to each other via a bus 26.

The non-volatile memory 24 is an example of a storage device that can retrieve stored information even after power supplied to the non-volatile memory 24 is interrupted. As the non-volatile memory 24, a semiconductor memory, for example, is used, or a hard disk may alternatively be used. The non-volatile memory 24 may not necessarily be built in the computer 20, and may be a storage device that is attachable to and detachable from the computer 20, such as a memory card. The OCR result DB 16 and the extraction result DB 17 are constructed in the non-volatile memory 24, for example.

A communication unit 27, an input unit 28, and a display unit 29, for example, are connected to the I/O interface 25.

The communication unit 27 has a communication protocol for connecting to a communication network and performing data communication with external devices, such as storage devices and computers, connected to the same communication network.

The input unit 28 is a device that receives an instruction from a user and supplies this instruction to the CPU 21. As the input unit 28, buttons, a touchscreen, a keyboard, and/or a mouse, may be used. The information processing apparatus 10 executes a function specified by a user via the input unit 28.

The display unit 29 is a device that displays information processed by the CPU 21 as an image. As the display unit 29, a liquid crystal display, an organic electroluminescence (EL) display, or a projector projecting a video image on a screen, for example, may be used.

In collaboration with the UI 12 shown in FIG. 3, the input unit 28 and the display unit 29 receive various instructions from a user and also supply various types of information about the operation and the state of the information processing apparatus 10 to a user.

Units connecting to the I/O interface 25 are not limited to those shown in FIG. 4. For example, a scanner unit may be connected to the I/O interface 25 so as to optically read the content of a document placed on platen glass and to convert the content of the document into an image. In this case, the CPU 21 receives an image 2 of a document from the scanner unit via the I/O interface 25.

If a scanner unit is not connected to the I/O interface 25, the information processing apparatus 10 may receive an image 2 from an external device via the communication unit 27, for example. The information processing apparatus 10 may alternatively receive an image 2 from a storage device that is attachable to and detachable from the computer 20, such as a memory card.

First Exemplary Embodiment

An example of processing executed by the information processing apparatus 10 will be described below in detail.

Figure 5:
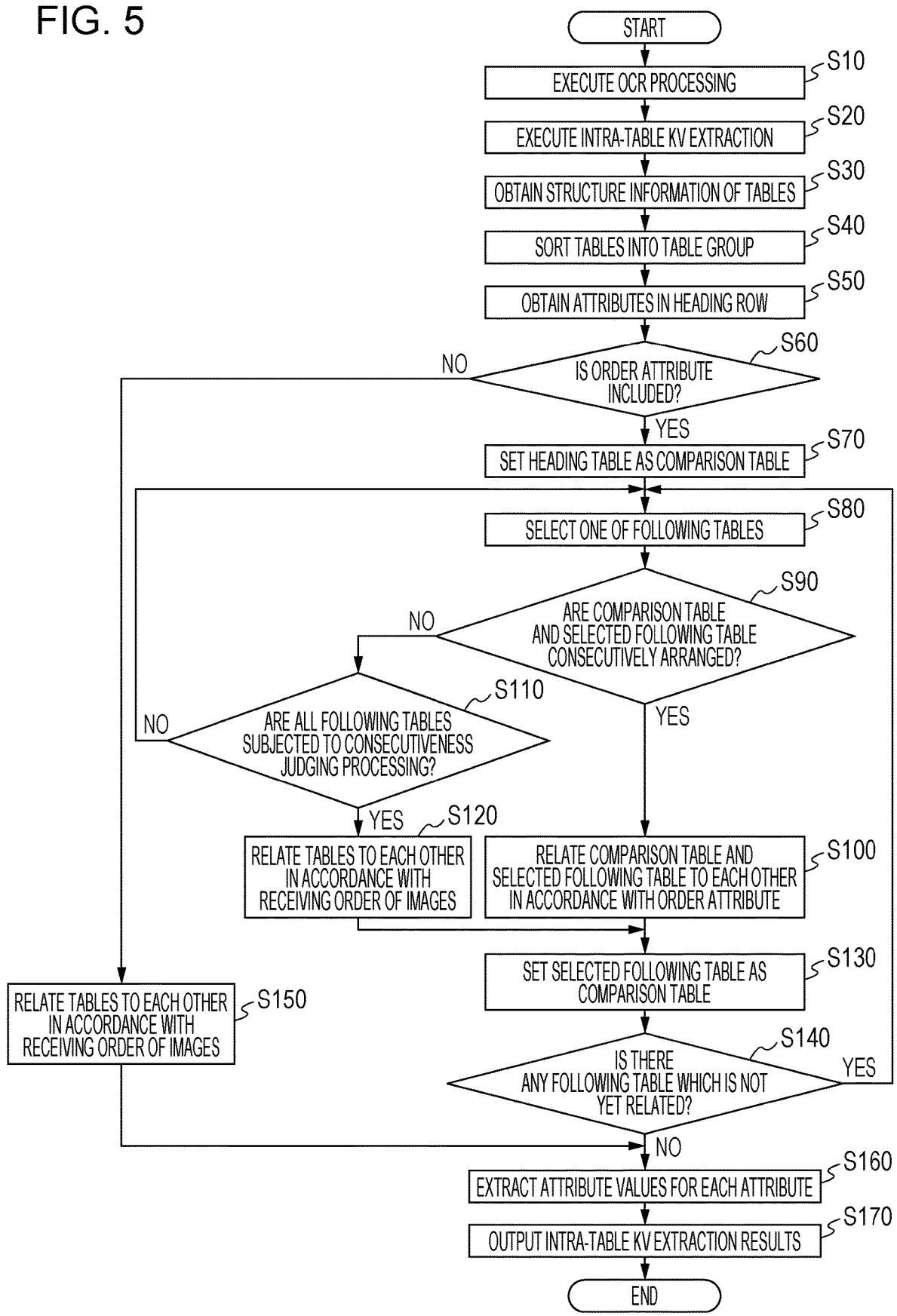
FIG. 5 is a flowchart illustrating an example of extraction processing according to a first exemplary embodiment.

FIG. 5 is a flowchart illustrating an example of extraction processing executed by the CPU 21 when the information processing apparatus 10 has received images 2 of a document from an external device via the communication unit 27, for example. It is assumed that the consecutiveness rule is set in the relating rule 18 of the information processing apparatus 10.

An information processing program that describes extraction processing according to a first exemplary embodiment is stored, for example, in the ROM 22 of the information processing apparatus 10. The CPU 21 reads the information processing program from the ROM 22 and executes extraction processing.

In step S10, as a result of executing OCR processing for each of the received images 2, the CPU 21 generates OCR results including character information within each image 2 and structure information of each table 4, and stores the OCR results in the OCR result DB 16 constructed in the non-volatile memory 24.

In step S20, the CPU 21 executes intra-table KV extraction to extract, from a table 4A including a heading row 6, attribute values for each attribute of the table 4A included in the heading row 6. The CPU 21 then stores the extracted attribute values in the RAM 23 in association with the corresponding attributes of the table 4A.

In step S30, the CPU 21 obtains the structure information of each table 4 included in the images 2 from the OCR result DB 16.

In step S40, by using the structure information of each table 4 obtained in step S30, the CPU 21 sorts the tables 4 included in the images 2 into table groups, each group including tables 4 having common characteristics in terms of the structure of the tables 4. For the sake of easy understanding, it is assumed that the tables 4 are sorted into one table group.

In step S50, the CPU 21 obtains the attributes of the table 4A included in the heading row 6. In the table 4A of the purchase order sheet shown in FIG. 1, for example, "No.", "Product Name", "Quantity", "Unit Price", and "Total" are obtained as the attributes of the table 4A included in the heading row 6.

In step S60, the CPU 21 judges whether the attributes of the table 4A obtained in step S50 includes an order attribute. The order attribute is an attribute representing the arrangement order of the tables 4. In the table 4A of the purchase order sheet in FIG. 1, for example, "No.", which is an example of the attributes included in the heading row 6, is information for managing the arrangement order of the rows of the tables 4 by using integers starting from "1" in ascending order, and is thus an example of the order attribute. In this manner, the arrangement order of the attribute values for the order attribute is determined by a certain regularity, such as ascending order or descending order. The CPU 21 is thus able to determine whether the divided tables 4 have the consecutiveness from the arrangement order of the attribute values of the order attribute.

If it is judged in step S60 that an order attribute is included in the heading row 6, the CPU 21 proceeds to step S70.

In step S70, the CPU 21 sets the heading table 4A as a comparison table, which is used to be compared with another table 4 to determine whether this table 4 has the consecutiveness. That is, setting the heading table 4A as a comparison table enables the CPU 21 to select a following table 4B to follow the heading table 4A from the divided tables 4 included in the table group.

In step S80, the CPU 21 selects one of the following tables 4B included in the table group. In this case, the CPU 21 may randomly select one of the following tables 4B, but it is more desirable to select one of the following tables 4B included in the images 2 in accordance with the receiving order of the images 2.

Usually, a user is more likely to image documents in page order than to image documents out of order by mistake. If one of the following tables 4B is selected in accordance with the receiving order of the images 2, the following table 4B positioned most closely to the comparison table when the images 2 are received is selected. This may decrease the time to relate the divided tables 4 to each other so that they become consecutive, compared with when one of the following tables 4B is selected randomly. In the first exemplary embodiment, the following table 4B selected in step S80 will be called the selected following table 4B.

In step S90, the CPU 21 compares the attribute value of the order attribute in the final row of the table 4A, which is set as a comparison table, with that in the first row of the selected following table 4B, and judges whether the attribute value of the order attribute of the comparison table and that of the selected following table 4B are arranged in accordance with a certain regularity determined for this order attribute. That is, the CPU 21 judges whether the attribute values of the order attribute are arranged consecutively from the final row of the comparison table to the first row of the selected following table 4B.

If the heading table 4A shown in FIG. 1 is set as the comparison table and if the following table 4B shown in FIG. 2A is the selected following table 4B, the attribute value of the attribute "No." in the final row of the comparison table is "7", while the attribute value positioned in the same column of the attribute "No." and in the first row of the selected following table 4B is "8". If the regularity determined for the attribute "No." is that the integer is incremented one by one from the top to the bottom of the tables 4, the CPU 21 judges that the comparison table and the selected following table 4B are arranged in consecutive order since the attribute value of the comparison table and that of the selected following table 4B are "7" and "8", which are consecutive numbers. The comparison table is an example of "one table" according to the first exemplary embodiment, while the selected following table 4B is an example of "the other table" according to the first exemplary embodiment.

If the attribute value of the order attribute in the final row of the comparison table and that in the first row of the selected following table 4B are found to be consecutive in step S90, the CPU 21 proceeds to step S100.

Since the comparison table and the selected following table 4B are arranged in consecutive order, in step S100, the CPU 21 relates the comparison table and the selected following table 4B to each other in accordance with the arrangement order of the attribute values of the order attribute so that the selected following table 4B follows the comparison table.

In step S130, the CPU 21 sets the selected following table 4B as a new comparison table.

In step S140, the CPU 21 judges whether there is a following table 4B which is not yet related among the following tables 4B in the table group. If there is such a following table 4B, the CPU 21 returns to step S80 and selects a following table 4B which is not yet related as a newly selected following table 4B, among the following tables 4B included in the table group.

If it is judged in step S90 that the comparison table and the selected following table 4B are not arranged consecutively, the CPU 21 proceeds to step S110.

In step S110, the CPU 21 judges whether there is a following table 4B which is not yet related and which is not yet subjected to judging processing for the consecutiveness in relation to the current comparison table. If there is such a following table 4B in the table group, the CPU 21 proceeds to step S80. In step S80, the CPU 21 selects, as a selected following table 4B, a following table 4B which is not yet related and which is not yet subjected to the above-described consecutiveness judging processing.

If it is judged in step S110 that the following tables 4B which are not yet related are all subjected to the consecutiveness judging processing, the CPU 21 proceeds to step S120.

An example of the situations where the result of step S90 becomes NO and the result of step S110 becomes YES is that, among the following tables 4B in the received images, at least one following table 4B is missing. In such a situation, it is difficult to relate the tables 4 to each other in accordance with the attribute values of the order attribute. In step S120, the CPU 21 thus disposes the selected following table 4B subsequent to the comparison table in accordance with the receiving order of the images 2. That is, the CPU 21 determines the following table 4B included in the image 2 located immediately after the image 2 including the comparison table when the images 2 are received, as the following table 4B to follow the comparison table.

If there are multiple table groups, the CPU 21 may detect a following table 4B to follow the comparison table from another table group, instead of relating the following table 4B to the comparison table in accordance with the receiving order of the images 2 in step S120. For example, tables 4 obtained by dividing the same table 4 may be distributed over multiple table groups due to the reading errors of the structure information of the tables 4. In this case, if a following table 4B which is consecutively arranged in relation to the comparison table is included in a table group other than that including the following table 4B selected in step S80, the CPU 21 may obtain such a following table 4B from this table group and dispose it subsequent to the comparison table.

After disposing the following table 4B subsequent to the comparison table in accordance with the receiving order of the images 2, the CPU 21 proceeds to step S130. In step S130, the CPU 21 sets the selected following table 4B related to the comparison table to be a new comparison table.

That is, steps S80 through S140 are repeated until all the tables 4 in the table group are related to each other. As a result, the individual divided tables 4 included in the table group are all related to each other. Among the tables 4 related to each other, tables 4 related to each other so as to be consecutive will be called a sequence of tables 4. A sequence of tables 4 is constituted by a heading table 4A and at least one following table 4B.

If it is judged in step S140 that all the tables 4 in the table group are related to each other, the CPU 21 proceeds to step S160.

As a result of relating the tables 4 in the table group to each other, the association between the attributes included in the heading row 6 of the table 4A and the attribute values included in the following tables 4B can be clarified. In step S160, in accordance with the arrangement order of the following tables 4B, the CPU 21 adds, for each attribute included in the heading row 6, the attribute values in the following tables 4B to those extracted from the table 4A by intra-table KV extraction in step S20. As a result, the attribute values of each attribute included in the heading row 6 can be obtained from the tables 4 related to each other.

If the individual tables 4 are related to each other so as to be consecutive, the attribute values of each attribute included in the heading row 6 can be obtained, as in the arrangement order of the attribute values of the original table 4 constituted by the individual tables 4.

In step S170, the CPU 21 outputs the attribute values obtained for each attribute included in the heading row 6 in step S160 and completes the extraction processing shown in FIG. 5.

If the individual tables 4 are related to each other so as to be consecutive, the attribute values of each attribute included in the heading row 6 can be output, as in the arrangement order of the attribute values of the original table 4 constituted by the individual tables 4.

If it is judged in step S60 that an order attribute is not included in the heading row 6, the CPU 21 is unable to relate the individual tables 4 included in the table group to each other by using the attribute values of an order attribute. The CPU 21 thus proceeds to step S150. In step S150, the CPU 21 relates the individual tables 4 in the table group to each other in accordance with the receiving order of the images 2 and then proceeds to step S160.

In this case, the related tables 4 are not necessarily arranged in consecutive order. The arrangement order of the attribute values obtained for each attribute in step S160 may not necessarily be the same as that of the original table 4. At least, however, the attribute values of each attribute included in the heading row 6 can be obtained from the following tables 4B that do not include the heading row 6.

In step S170, the CPU 21 outputs the attribute values obtained for each attribute included in the heading row 6. In this case, it is desirable that the CPU 21 output, together with the attribute values, information indicating whether the related tables 4 are arranged in consecutive order. More specifically, if the attribute values are obtained even once from the tables 4 related to each other in accordance with the receiving order of the images 2 in step S120 or S150, the CPU 21 outputs information indicating that the consecutiveness of the tables 4 is not guaranteed. Conversely, if the attribute values are never obtained even once from the tables 4 that are related to each other in accordance with the receiving order of the images 2 in step S120 or S150, the CPU 21 outputs information indicating that the consecutiveness of the tables 4 is guaranteed.

If the tables 4 included in the received images 2 are sorted into multiple table groups in step S40, steps S50 through S170 are executed for each table group.

As described above, even when a single table 4 is divided into plural tables 4 distributed over multiple pages and following tables 4B do not have a heading row 6, the information processing apparatus 10 can relate the divided tables 4 to each other so that the attribute values of the following tables 4B become consecutive, in accordance with the arrangement order of the attribute values of the order attribute included in the heading row 6 of the table 4A. It is thus possible for the information processing apparatus 10 to obtain the attribute values for each attribute included in the heading row 6 from the divided tables 4, as in the arrangement order of the attribute values of the original single table 4.

Second Exemplary Embodiment

In the first exemplary embodiment, a description has been given of an example of processing to be executed when the consecutiveness rule is set in the relating rule 18 of the information processing apparatus 10. In a second exemplary embodiment, an example of processing to be executed when the consistency rule is set in the relating rule 18 will be discussed.

The information processing apparatus 10 according to the second exemplary embodiment first checks whether tables 4 generated by relating individual tables 4 in a table group to each other has a portion missing from an original table 4 or an excess portion which is not included in the original table 4, and then obtains the attribute values for each attribute included in a heading row 6 from the divided tables 4.

Figure 6:
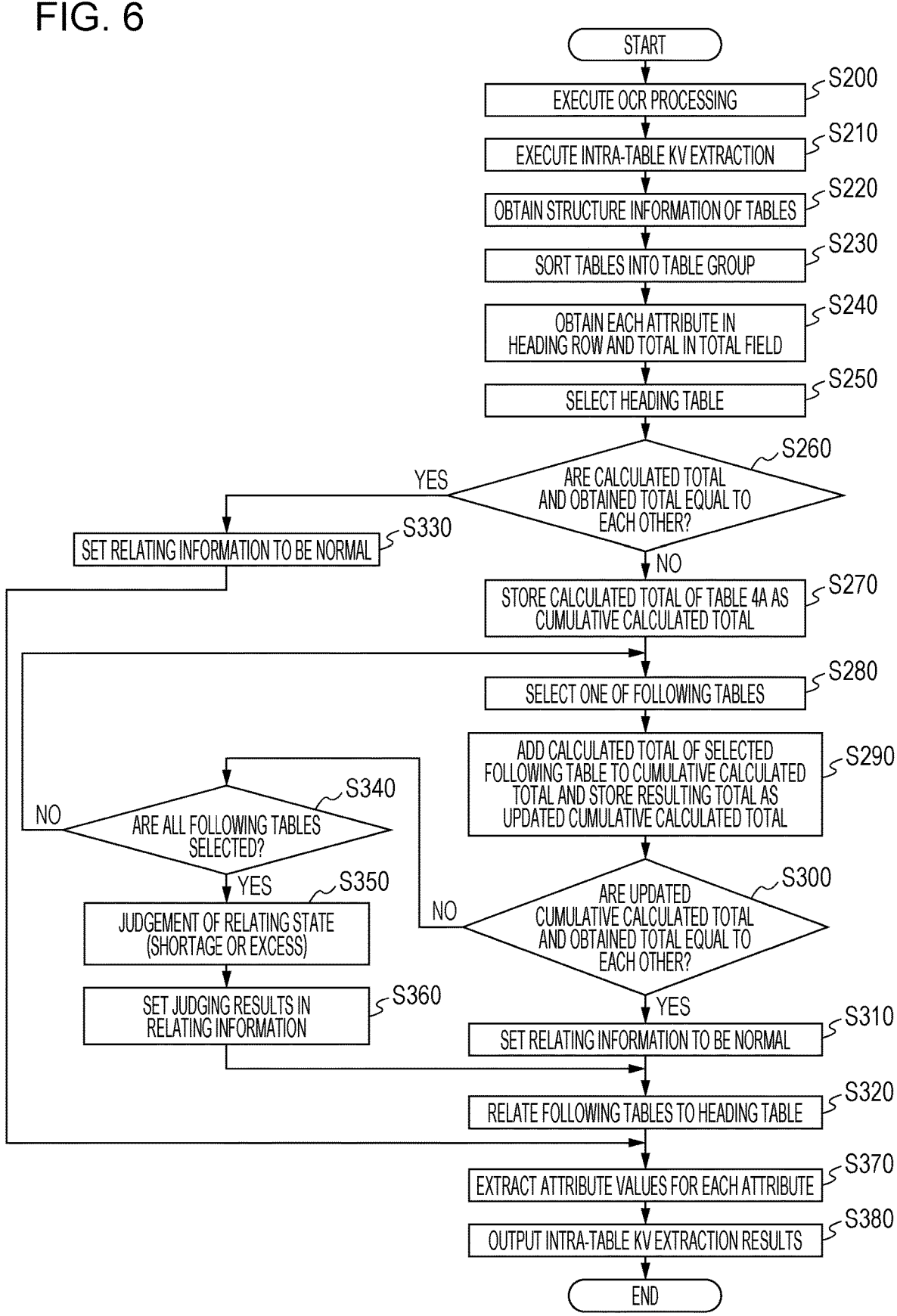
FIG. 6 is a flowchart illustrating an example of extraction processing according to a second exemplary embodiment.

FIG. 6 is a flowchart illustrating an example of extraction processing executed by the CPU 21 when the information processing apparatus 10 has received images 2 of a document from an external device via the communication unit 27, for example.

An information processing program that describes extraction processing according to the second exemplary embodiment is stored, for example, in the ROM 22 of the information processing apparatus 10. The CPU 21 reads the information processing program from the ROM 22 and executes extraction processing.

Steps S200 through S230 in FIG. 6 are the same as steps S10 through S40 of the extraction processing of the first exemplary embodiment shown in FIG. 5, and an explanation thereof will thus be omitted. As in the first exemplary embodiment, for the sake of easy understanding, the individual tables 4 are sorted into one table group in step S230.

In step S240, the CPU 21 obtains each attribute included in the heading row 6 of the table 4A. The CPU 21 also detects, from one of the tables 4 in the table group, a portion in which a total of the attribute values of at least one attribute included in the heading row 6 of the table 4A is indicated (hereinafter such a portion will be called a total field). The CPU 21 obtains the total of the attribute values indicated in the detected total field, that is, the total of the attribute values of one of the attributes included in the heading row 6 of the table 4A.

For example, in the tables 4 shown in FIGS. 1 through 2C, the CPU 21 detects at least one of "Grand Total" indicated in FIG. 1 and that in FIG. 2C from the tables 4 as a total field, and obtains "566,000" written in the same row as the total field, as the total in the total field. Hereinafter, the total in a total field obtained from an image 2 including a table 4 in a table group will be called the obtained total. That is, the obtained total is an example of a total which has been indicated in an image 2 including a table 4.

To detect a total field from a table 4, characters representing the meaning of a total, such as "Total", "Total Sum", and "Cumulative", are detected from the table 4. To obtain the total in a total field, information on the position of the attribute value in the total field in relation to the position of the total field may be provided in advance. Then, the CPU 21 can obtain the total in the total field from the table 4 in accordance with this information.

If a character string related to one of the attributes in the heading row 6 of the table 4A is included in the item name in the detected total field, it is possible to determine that the total indicated in the total field is a total of the attribute values of this attribute in the heading row 6. For example, "Grand Total", which is an example of the total field, shown in FIGS. 1 and 2C, includes a character string "Total". It can thus be determined that "Grand Total" is a total field representing the total of the attribute values of the attribute "Total" included in the heading row 6 of the table 4A in FIG. 1. Hereinafter, among the attributes included in the heading row 6 of the table 4A, if the total of the attribute values of one of the attributes is indicated in a total field, such an attribute will be called a matching attribute.

Alternatively, if the position of the total in the total field is related to the position of one of the attributes included in the heading row 6, the CPU 21 may determine that the total indicated in the total field is a total of the attribute values of this attribute in the heading row 6. For example, if, as in the table 4B in FIG. 2C, the column of "566,000", which represents the total of "Grand Total", is located in the same column of "Total" in the heading row 6 of the table 4A in FIG. 1, the CPU 21 determines that "566,000" is a total field in which the total of the attribute values of the attribute "Total" is indicated.

In step S250, the CPU 21 selects the heading table 4A and calculates the total of the attribute values for the matching attribute in the heading table 4A. The total calculated from the attribute values indicated in a table 4 by the CPU 21 will be called the calculated total.

In step S260, the CPU 21 judges whether the calculated total determined for the matching attribute in step S250 and the obtained total found for the matching attribute in step S240 are equal to each other. If the calculated total and the obtained total are different values, the CPU 21 proceeds to step S270.

If the calculated total and the obtained total are different, it means that there is at least one following table 4B to follow the heading table 4A. Then, in step S270, the CPU 21 stores the calculated total of the heading table 4A obtained in step S250 in the RAM 23 as a cumulative calculated total.

In step S280, the CPU 21 selects one of the following tables 4B included in the table group. In this case, the CPU 21 may randomly select one of the following tables 4B, but it is more desirable to select one of the following tables 4B included in the images 2 in accordance with the receiving order of the images 2. In the second exemplary embodiment, the following table 4B selected in step S280 will be called a selected following table 4B.

Then, the CPU 21 calculates the total of the attribute values in the selected following table 4B for the matching attribute. The CPU 21 recognizes the attribute values in the selected following table 4B positioned in the same column as the column of the matching attribute in the heading row 6 as the attribute values in the selected following table 4B for the matching attribute.

In step S290, the CPU 21 adds the calculated total of the selected following table 4B obtained in step S280 to the cumulative calculated total stored in the RAM 23, and stores the resulting cumulative calculated total in the RAM 23 as the updated cumulative calculated total.

In step S300, the CPU 21 judges whether the updated cumulative calculated total stored in step S290 and the obtained total found for the matching attribute in step S240 are the same value. If the cumulative calculated total and the obtained total are found to be the same, the CPU 21 proceeds to step S310.

If the cumulative calculated total and the obtained total are the same, it means that, if the tables 4 subjected to obtaining of the calculated totals forming the cumulative calculated total are related to each other, the original table 4 can be constructed without any excess or shortage.

That is, the individual tables 4 subjected to obtaining of the calculated totals forming the cumulative calculated total, which is the same value as the obtained total, have consistency. In step S310, the CPU 21 thus sets relating information of the tables 4 to be "normal". The relating information of the tables 4 is information indicating in which manner the tables 4 are related to each other in terms of the consistency. If the relating information is "normal", it means that the individual tables 4 related to each other have consistency.

In step S320, the CPU 21 relates the following tables 4B subjected to obtaining of the calculated totals forming the cumulative calculated total to the heading table 4A selected in step S250. Relating of the following tables 4B to the heading table 4A is desirably performed in the selecting order of the following tables 4B in step S280. For example, if the following tables 4B are selected in order of the following table 4B in FIG. 2A, that in FIG. 2B, and that in FIG. 2C for the heading table 4A in FIG. 1, the CPU 21 relates the tables 4 in order of the table 4 in FIG. 1, that in FIG. 2A, that in FIG. 2B, and that in FIG. 2C. The CPU 21 then stores the tables 4 in the extraction result DB 17 in association with the relating information.

Steps S370 and S380 are the same as steps S160 and S170 of the first exemplary embodiment shown in FIG. 5. That is, the CPU 21 extracts the attribute values for each attribute included in the heading row 6 from the related tables 4 and outputs the extracted attribute values. The CPU 21 then completes the extraction processing in FIG. 6.

If the cumulative calculated total and the obtained total are found to be different in step S300, the CPU 31 proceeds to step S340.

In step S340, the CPU 21 judges whether all the following tables 4B included in the table group have been selected. If there is any unselected following table 4B, the total of the attribute values in this following table 4B is added to the cumulative calculated total. Then, the resulting cumulative calculated total and the obtained total may become equal to each other.

Hence, the CPU 21 proceeds to step S280 and selects one of the following tables 4B included in the table group as a newly selected following table 4B. The CPU 21 then executes steps S290 and S300 for the newly selected following table 4B.

If it is judged in step S340 that all the following tables 4B in the table group have been selected, the CPU 21 proceeds to step S350.

If the cumulative calculated total and the obtained total do not become the same even though all the following tables 4B in the table group have been selected, there is excess or shortage in the number of tables 4 included in the table group in comparison with the number of tables 4 obtained by dividing the original table 4. Such a situation occurs when tables 4 are not sorted correctly into table groups or when an unnecessary table 4 is mixed into the received images 2 or a necessary table 4 is not included in the received images 2.

That is, the tables 4 included in the table group lack consistency. In step S350, the CPU 21 judges whether the relating state of the tables 4 is "shortage" or "excess".

If the relating state is "shortage", it means that a table 4 is missing from the divided tables 4 and it is not possible to construct the original table 4. More specifically, if the cumulative calculated total is less than the obtained total, the CPU 21 determines that the relating state of the tables 4 is "shortage".

If the relating state is "excess", it means that a table 4, which is a different type of table 4 from the original table 4, is included in the table group as a following table 4B, and it is not possible to construct the original table 4. More specifically, if the cumulative calculated total exceeds the obtained total, the CPU 21 determines that the relating state of the tables 4 is "excess".

In step S360, the CPU 21 sets the judging result obtained in step S350 in the relating information of the tables 4 and proceeds to step S320.

If the calculated total and the obtained total are found to be the same step S260, the CPU 21 proceeds to step S330.

In this case, the heading table 4A is the original table 4. That is, there is no following table 4B to follow the heading table 4A. In this case, the heading table 4A has consistency by itself. In step S330, the CPU 21 sets the relating information of the tables 4 to be "normal" and proceeds to step S370.

When outputting the attribute values of each attribute included in the heading row 6 in step S380, the CPU 21 may also output information indicating whether the attribute values have consistency. More specifically, if the attribute values are obtained from the tables 4 associated with relating information set to be "normal", the CPU 21 outputs information that the consistency of the attribute values is guaranteed. Conversely, if the attribute values are obtained from the tables 4 associated with relating information set to be "shortage" or "excess", the CPU 21 outputs information that the consistency of the attribute values is not guaranteed.

In the information processing apparatus 10 according to the second exemplary embodiment, even when a single original table 4 is divided into plural tables 4 distributed over multiple pages and the following tables 4B do not have a heading row 6, the attribute values of each attribute included in the heading row 6 can be obtained from the divided tables 4 associated with relating information set to be "normal" without any excess or shortage in comparison with the attribute values in the original table 4.

Even if an order attribute is not included in the heading row 6 of a table 4, if a matching attribute is included, the consistency rule can be set in the relating rule 18 of the information processing apparatus 10. Then, all the attribute values indicated in the original table 4 can be obtained without any excess or shortage for each attribute included in the heading row 6 from the divided tables 4 associated with relating information set to be "normal".

Third Exemplary Embodiment

The information processing apparatus 10 of the first exemplary embodiment obtains the attribute values for each attribute included in the heading row 6 from each of the divided tables 4, as in the arrangement order of the attribute values in the original table 4. In this configuration, it is clear that the obtained attribute values have consecutiveness, but it is not known whether the attribute values indicated in the original table 4 are all obtained for each attribute in the heading row 6 without any access or shortage.

For example, if, among the tables 4 distributed over the four pages shown in FIGS. 1 through 2C, the tables 4 of the first through third pages are sorted into the same table group, while the last fourth page, that is, the table 4B in FIG. 2C, is sorted into another table group, the attribute values obtained from the table group including the first through third pages have consecutiveness but lack consistency.

In a third exemplary embodiment, the information processing apparatus 10 obtains attribute values both having consecutiveness and consistency for each attribute included in a heading row 6 from each of the divided tables 4.

Figure 7:
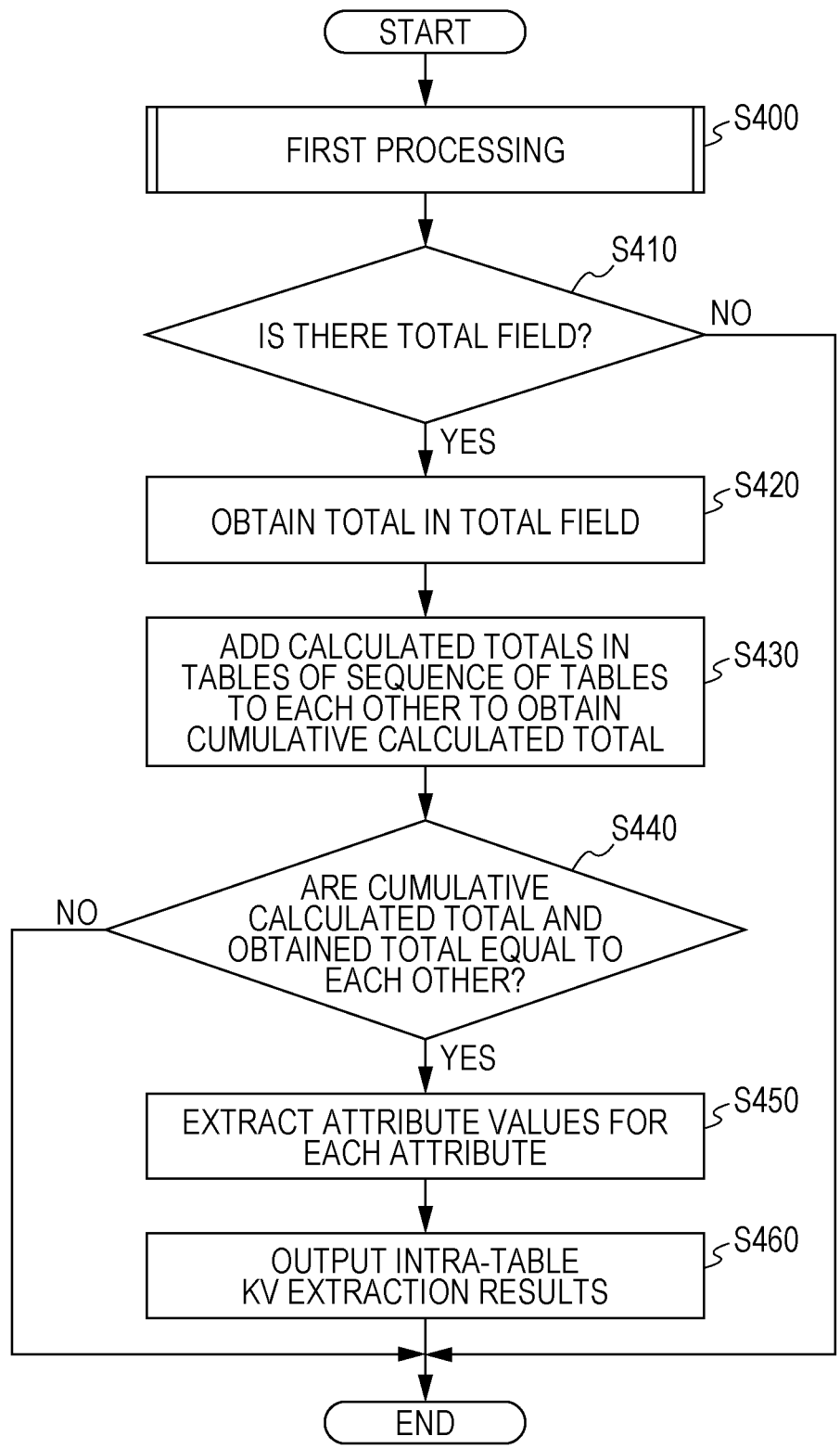
FIG. 7 is a flowchart illustrating an example of extraction processing according to a third exemplary embodiment.

FIG. 7 is a flowchart illustrating an example of extraction processing executed by the CPU 21 when the information processing apparatus 10 has received images 2 of a document from an external device via the communication unit 27, for example.

It is assumed that both of the consecutiveness rule and the consistency rule are set in the relating rule 18 of the information processing apparatus 10.

An information processing program that describes extraction processing according to the third exemplary embodiment is stored, for example, in the ROM 22 of the information processing apparatus 10. The CPU 21 reads the information processing program from the ROM 22 and executes extraction processing.

In step S400, the CPU 21 executes first processing. The first processing is processing according to steps S10 through S150 of the extraction processing of the first exemplary embodiment. It is assumed that the divided tables 4 are related to each other as a sequence of tables 4 as a result of executing the first processing.

In step S410, the CPU 21 judges whether a total field is included in any of the images 2 having the sequence of tables 4. If a total field is included, the CPU 21 proceeds to step S420 and obtains the total indicated in the total field.

As discussed above in the explanation of step S240 of the extraction processing of the second exemplary embodiment shown in FIG. 6, the CPU 21 identifies a matching attribute corresponding to the total field by using at least one of information on the item name in the total field and information on the position of the total in the total field.

In step S430, the CPU 21 sequentially adds, for the matching attribute, the calculated total of the attribute values in one table 4 in the sequence of tables 4 to that of another table 4 in the sequence of tables 4 to each other, thereby obtaining the cumulative calculated total of the attribute values of all the tables 4 for the matching attribute.

In step S440, the CPU 21 judges whether the obtained total found in step S420 and the cumulative calculated total determined in step S430 are the same value. If the obtained total and the cumulative calculated total are found to be the same value, the CPU 21 proceeds to step S450.

In this case, the sequence of tables 4 obtained by relating the individual tables 4 to each other in the first processing has consistency. The CPU 21 thus executes steps S450 and S460, which are the same as steps S160 and S170 of the extraction processing of the first exemplary embodiment shown in FIG. 5. More specifically, the CPU 21 extracts the attribute values for each attribute included in the heading row 6 from the sequence of tables 4 having consecutiveness and consistency, and outputs the extraction results. The CPU 21 then completes the extraction processing in FIG. 7. The CPU 21 may inform a user that the attribute values obtained from the sequence of tables 4 have consecutiveness and consistency.

If it is judged in step S410 that no total field is included in the images 2 having the tables 4 forming the sequence of tables 4, it is not known whether the sequence of tables 4 has consistency as well as consecutiveness. Hence, the CPU 21 does not obtain the attribute values for each attribute included in the heading row 6 from the sequence of tables 4 and terminates the extraction processing in FIG. 7. In this case, the CPU 21 desirably informs a user, for example, that processing for obtaining the attribute values is terminated because it is not known whether the sequence of tables 4 has consistency.

If it is judged in step S440 that the obtained total and the cumulative calculated total are different, it means that the sequence of tables 4 has consecutiveness but lacks consistency. Hence, the CPU 21 does not obtain the attribute values for each attribute included in the heading row 6 from the sequence of tables 4 and terminates the extraction processing in FIG. 7. In this case, the CPU 21 desirably informs a user, for example, that processing for obtaining the attribute values is terminated because the sequence of tables 4 lacks consistency.

As described above, when the tables 4 obtained by relating divided tables 4 to each other have both consecutiveness and consistency, the information processing apparatus 10 according to the third exemplary embodiment obtains the attribute values for each attribute included in the heading row 6. That is, the attribute values obtained for each attribute from the individual divided tables 4 by executing the extraction processing of the third exemplary embodiment have consecutiveness and consistency.

If, in response to information that the sequence of tables 4 lacks consistency or it is not known whether the sequence of tables 4 has consistency, a user has provided an instruction to obtain attribute values via the input unit 28, the CPU 21 may obtain the attribute values for each attribute included in the heading row 6 from the sequence of tables 4 even though the sequence of tables 4 lacks consistency.

Fourth Exemplary Embodiment

The information processing apparatus 10 according to the third exemplary embodiment judges whether a sequence of tables 4 having consecutiveness also has consistency, and if the tables 4 obtained by relating the divided tables 4 have both consecutiveness and consistency, the information processing apparatus 10 obtains the attribute values for each attribute included in the heading row 6. That is, in the third exemplary embodiment, the consecutiveness of the tables 4 is first determined, and then, the consistency of the tables 4 is determined. However, this order may be reversed.

In a fourth exemplary embodiment, the information processing apparatus 10 first determines the consistency of divided tables 4 and then determines the consecutiveness of the divided tables 4. Then, the information processing apparatus 10 obtains the attribute values having consecutiveness and consistency for each attribute included in a heading row 6.

Figure 8:
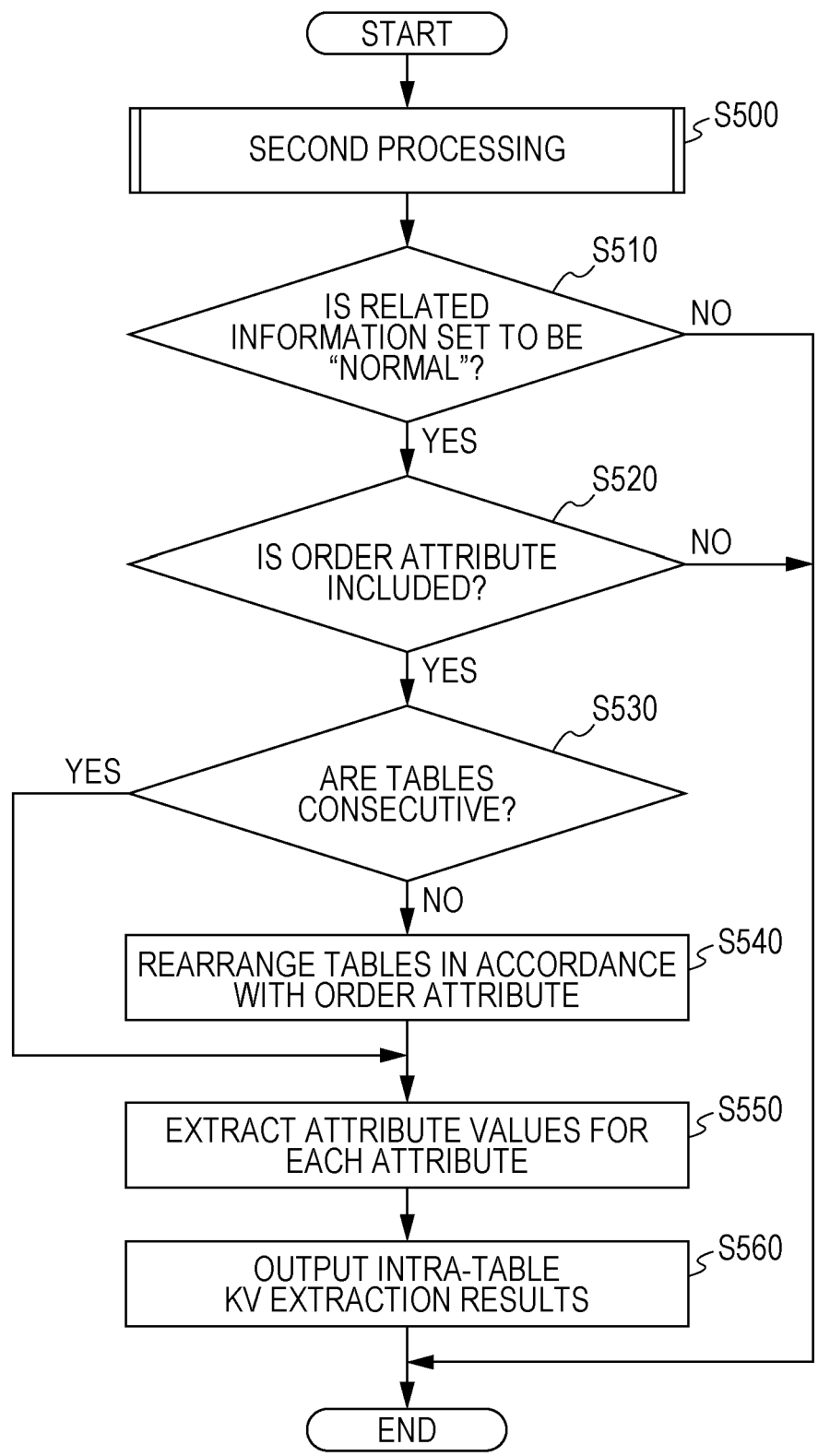
FIG. 8 is a flowchart illustrating an example of extraction processing according to a fourth exemplary embodiment.

FIG. 8 is a flowchart illustrating an example of extraction processing executed by the CPU 21 when the information processing apparatus 10 has received images 2 of a document from an external device via the communication unit 27, for example.

It is assumed that both of the consecutiveness rule and the consistency rule are set in the relating rule 18 of the information processing apparatus 10.

An information processing program that describes extraction processing according to the fourth exemplary embodiment is stored, for example, in the ROM 22 of the information processing apparatus 10. The CPU 21 reads the information processing program from the ROM 22 and executes extraction processing.

In step S500, the CPU 21 executes second processing. The second processing is processing according to steps S200 through S360 of the extraction processing of the second exemplary embodiment.

In step S510, the CPU 21 refers to the content of relating information of the tables 4 related to each other in step S500 (hereinafter simply called the related tables 4 in the fourth exemplary embodiment) and judges whether the relating information is set to be "normal".

If the relating information is not set to be "normal", it is not guaranteed that the related tables 4 have consistency, and the CPU 21 thus terminates the extraction processing. In this case, the CPU 21 desirably informs a user that obtaining of attribute values is terminated because it is not known whether the related tables 4 have consistency.

If it is judged in step S510 that the relating information is set to be "normal", the CPU 21 proceeds to step S520. That is, when the tables 4 related to each other as a result of executing the second processing has consistency, the CPU 21 proceeds to step S520.

In step S520, the CPU 21 judges whether an order attribute is included in the heading row 6 of the related tables 4. If an order attribute is not included, the CPU 21 terminates the extraction processing in FIG. 8 since the consecutiveness of the related tables 4 is not guaranteed. In this case, the CPU 21 desirably informs a user that obtaining of attribute values is terminated because it is not known whether the related tables 4 have consecutiveness even though they have consistency.

If it is determined in step S520 that an order attribute is included in the heading row 6 of the related tables 4, the CPU 21 proceeds to step S530.

In step S530, the CPU 21 judges whether the related tables 4 are arranged in consecutive order. For making this judgement, the approach discussed in step S90 of the extraction processing of the first exemplary embodiment shown in FIG. 5 is used. If the related tables 4 are not arranged in consecutive order, the CPU proceeds to step S540.

It is at least guaranteed that the related tables 4 have consistency as a result of executing step S510. Accordingly, if the order of the related tables 4 is rearranged so that the attribute values in the related tables 4 corresponding to the order attribute become consecutive, the rearranged tables 4 become consecutive.

In step S540, the CPU 21 thus refers to the attribute values in the related tables 4 corresponding to the order attribute and rearranges the related tables 4 so that they become consecutive. The CPU 21 then proceeds to step S550.

If it is judged in step S530 that the related tables 4 are arranged in consecutive order, rearranging of the order of the related tables 4 is not necessary, and the CPU 21 proceeds to step S550 by skipping step S540.

The CPU 21 executes steps S550 and S560, which are the same as steps S160 and S170 of the extraction processing of the first exemplary embodiment shown in FIG. 5. More specifically, the CPU 21 extracts the attribute values for each attribute included in the heading row 6 from the related tables 4 having consecutiveness and consistency, and outputs the extraction results. The CPU 21 then completes the extraction processing in FIG. 8. The CPU 21 may inform a user that the attribute values obtained from the related tables 4 have consecutiveness and consistency.

As described above, when the tables 4 obtained by relating divided tables 4 to each other have both consecutiveness and consistency, the information processing apparatus 10 according to the fourth exemplary embodiment obtains the attribute values for each attribute included in the heading row 6. That is, the attribute values obtained for each attribute from the individual divided tables 4 by executing the extraction processing of the fourth exemplary embodiment have consecutiveness and consistency.

If, in response to information that the related tables 4 lack consistency or it is not known whether the related tables 4 have consecutiveness, a user has provided an instruction to obtain attribute values via the input unit 28, the CPU 21 may obtain the attribute values for each attribute included in the heading row 6 from the related tables 4 even though the related tables 4 lack at least one of the consistency and consecutiveness.

In the extraction processing executed by the information processing apparatus 10 according to the fourth exemplary embodiment, if the relating information associated with the related tables 4 is not set to be "normal", the CPU 21 terminates the extraction processing without obtaining the attribute values from the related tables 4 since it is not guaranteed that the related tables 4 have consistency. Nevertheless, even if the relating information associated with the related tables 4 is not set to be "normal", it may be possible to make adjustment so that the related tables 4 become consistent.

As discussed in the first exemplary embodiment, tables 4 obtained by dividing the same table 4 may be distributed over multiple table groups due to the reading errors of the structure information of the tables 4.

In the case of related tables 4 associated with relating information set to be "shortage", one of the tables 4 obtained by dividing the same table 4 may have been sorted into a table group different from the table group including the related tables 4.

To deal with such a situation, if the relating information associated with related tables 4 indicates "shortage", the CPU 21 may obtain a table 4 which is consistent with the related tables 4 from a table group other than that including the related tables 4 and relate the obtained table 4 to the related tables 4. In this case, the resulting related tables 4 become consistent with each other, and the CPU 21 can proceed to step S520 in FIG. 8.

Conversely, in the case of related tables 4 associated with relating information set to be "excess", a table 4 obtained by dividing a different type of table 4 from that of the related tables 4 is mixed into the table group of the related tables 4.

To deal with such a situation, if the relating information associated with related tables 4 indicates "excess", the CPU 21 refers to the attribute values of the related tables 4 corresponding to the order attribute included in the heading row 6 and removes the table 4 which is not consecutive among the related tables 4. The CPU 21 then checks the consistency of the resulting related tables 4 by comparing the obtained total and the cumulative calculated total of the attribute values corresponding to the matching attribute.

After checking that the related tables 4 have consistency, the CPU 21 can proceed to step S520 in FIG. 8.

With the above-described adjustment processing, even when the relating information associated with related tables 4 indicates information other than "normal", it may be possible to make adjustment so that the related tables 4 become consistent.

In the extraction processing shown in FIG. 6 executed by the information processing apparatus 10 according to the second exemplary embodiment, if the relating information is set as "shortage" or "excess" in step S360, the CPU 21 may execute the above-described adjustment processing and then extract the attribute values for each attribute included in the heading row 6 from the related tables 4.

Modified Examples of Consecutiveness Judging

There may be a case in which the order attribute is not included in the heading row 6 of the heading table 4A included in a table group. Even in this situation, the CPU 21 may relate divided tables 4 to each other so that they become consecutive by using external information which is located outside the heading table 4A and following tables 4B and which indicates the consecutiveness between the heading table 4 and following tables 4B.

Figures 9, 10:
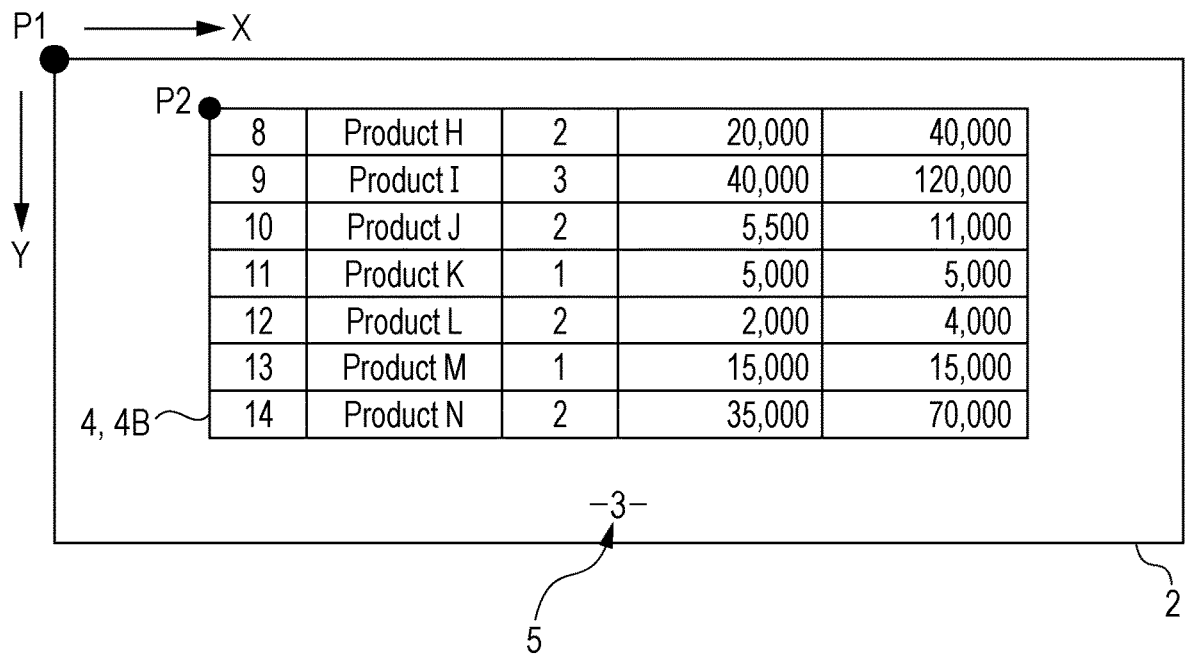
FIG. 9 illustrates an example of a page number.
FIG. 10 illustrates an example of a table number.

FIG. 9 illustrates an example of a page number, which is an example of external information. If an image 2 including a table 4 has a page number 5, the CPU 21 may be able to relate the divided tables 4 sorted into the same table group so that they become consecutive, by using this page number 5 as external information.

FIG. 10 illustrates an example of a table number 7, which is an example of external information. As shown in FIG. 10, a table number 7, which indicates the order of tables 4, such as "Table 1" and "FIG. 1", may be provided near each of the divided tables 4. Especially for documents such as papers and reports, it is customary to provide a table number 7 for each of the tables 4 obtained by dividing the same table 4. The CPU 21 is thus able to relate the divided tables 4 sorted into the same table group so that they become consecutive, by using the table number 7 as external information.

If an order attribute is included in the heading row 6 of the heading table 4A included in a table group, the CPU 21 may first relate the divided tables 4 so that they become consecutive, based on the arrangement order of the attribute values of this order attribute. Then, the CPU 21 may double-check whether the related tables 4 are consecutive by using external information.

A description has been given of an example in which a single table 4 is divided into plural tables 4 each indicated on one page, as shown in FIGS. 1 through 2C, and the divided tables 4 are related to each other so that they have at least one of the consecutiveness and consistency. However, a table 4 may be divided in a different manner. For example, a single table 4 may be divided into plural tables 4 indicated on the same page, as shown in FIG. 11.

Regardless of the dividing mode of tables 4, as long as a single table 4 is divided into plural tables 4, the information processing apparatus 10 is able to relate these tables 4 to each other so that they have at least one of the consecutiveness and consistency and to obtain the attribute values for each attribute included in the heading row 6. In the dividing mode of the tables 4 shown in FIG. 11, therefore, the information processing apparatus 10 is able to relate the tables 4 so that they have at least one of the consecutiveness and consistency and obtain the attribute values for each attribute included in the heading row 6.

An example of the information processing apparatus 10 has been discussed through illustration of the exemplary embodiments. However, the disclosed mode of the information processing apparatus 10 is an only example and is not limited to that in the exemplary embodiments. Various modifications and/or improvements may be made to the exemplary embodiments without departing from the spirit and scope of the disclosure. Exemplary embodiments obtained by making modifications and/or improvements are also encompassed within the technical range of the disclosure. For example, the order of steps of extraction processing shown in each of FIGS. 5 through 8 may be changed without departing from the spirit and scope of the disclosure.

In the above-described exemplary embodiments, extraction processing is implemented by software by way of example. However, processing equivalent to extraction processing shown in FIGS. 5 through 8 may be implemented by using hardware. In this case, extraction processing is executed faster than using software.

Although the information processing program is installed in the ROM 22 in the above-described exemplary embodiments, it may be provided in a different manner. For example, the information processing program may be provided as a result of being recorded in a storage medium that can be read by the computer 20, such as in an optical disc (a compact disc (CD)-ROM or a digital versatile disc (DVD)-ROM), or in a portable semiconductor memory, such as a universal serial bus (USB) memory and a memory card.

The ROM 22, the non-volatile memory 24, a CD-ROM, a DVD-ROM, a USB memory, and a memory card are examples of non-transitory storage mediums.

Additionally, the information processing apparatus 10 may download the information processing program from an external device connected to the communication unit 27 via a communication network and store the downloaded information processing program in a non-transitory storage medium. In this case, the CPU 21 of the information processing apparatus 10 reads the information processing program from the non-transitory storage medium and executes extraction processing.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
      extract a table group including a first table and at least one second table from a plurality of tables formed as images, the first table and the at least one second table having a common characteristic in terms of a table structure, the first table including a heading row representing attributes of attribute values included in the first table and the at least one second table, the at least one second table not including the heading row;
      relate the first table and the at least one second table included in the table group to each other so that rows of the first table and rows of the at least one second table are arranged in consecutive order, by using attribute values of an attribute which is included in the heading row and which represents consecutiveness of the rows of the first table and the rows of the at least one second table;
      detect whether there is excess or shortage in the first table and the at least one second table forming the table sequence by using attribute values of an attribute which is included in the heading row and which represents consistency regarding excess and shortage in the first table and the at least one second table forming the table sequence; and
      obtain attribute values corresponding to each of the attributes included in the heading row from a table sequence if neither excess nor shortage is detected in the first table and the at least one second table, wherein the table sequence includes the first table and the at least one second table arranged in consecutive order.

2. The information processing apparatus according to claim 1, wherein:
   the attribute representing the consistency is a first attribute included in the heading row, a total of attribute values in the table sequence corresponding to the first attribute having been indicated in an image including one of the first table and the at least one second table forming the table sequence; and
   the processor is configured to determine that there is neither excess nor shortage in the first table and the at least one second table forming the table sequence if the total of the attribute values indicated in the image of one of the first table and the at least one second table forming the table sequence is equal to a calculated total of the attribute values, which correspond to the first attribute, in the first table and the at least one second table forming the table sequence.

3. The information processing apparatus according to claim 1, wherein:
the attribute representing the consecutiveness is a second attribute indicating an arrangement order of the attribute values in the table group; and
the processor is configured to, when the attribute value of the second attribute in a final row of one of two tables selected from the table group and the attribute value of the second attribute in a first row of the other table of the two tables are arranged in consecutive order in accordance with a certain regularity, detect that the one and the other tables are arranged in consecutive order.

4. The information processing apparatus according to claim 1, wherein:
the attribute representing the consecutiveness is a second attribute indicating an arrangement order of the attribute values in the table group; and
the processor is configured to, when the attribute value of the second attribute in a final row of one of two tables selected from the table group and the attribute value of the second attribute in a first row of the other table of the two tables are arranged in consecutive order in accordance with a certain regularity, detect that the one and the other tables are arranged in consecutive order.

5. The information processing apparatus according to claim 2, wherein:
the attribute representing the consecutiveness is a second attribute indicating an arrangement order of the attribute values in the table group; and
the processor is configured to, when the attribute value of the second attribute in a final row of one of two tables selected from the table group and the attribute value of the second attribute in a first row of the other table of the two tables are arranged in consecutive order in accordance with a certain regularity, detect that the one and the other tables are arranged in consecutive order.

6. The information processing apparatus according to claim 1, wherein, if no attribute representing the consecutiveness is included in the heading row,
the processor is configured to detect whether there is excess or shortage in the first table and the at least one second table forming the table group by using attribute values of an attribute which is included in the heading row and which represents consistency regarding excess and shortage in the first table and the at least one second table forming the table group; and
the processor is configured to obtain attribute values corresponding to each of the attributes included in the heading row from the table group if neither excess nor shortage is detected in the first table and the at least one second table.

7. The information processing apparatus according to claim 6, wherein, if no attribute representing the consistency is included in the heading row,
the processor is configured to relate, by using external information, the first table and the at least one second table forming the table group to each other so that the first table and the at least one second table are arranged in consecutive order, the external information being information which is located outside the first table and the at least one second table and which represents the consecutiveness of the first table and the at least one second table; and
the processor is configured to obtain the attribute values corresponding to each of the attributes included in the heading row from the table sequence including the first table and the at least one second table arranged in consecutive order.

8. The information processing apparatus according to claim 7, wherein the external information is one of a page number and a table number, the page number being a number of a page including one of the first table and the at least one second table, the table number being a number representing an arrangement order of the first table and the at least one second table.

9. An information processing apparatus comprising:
a processor configured to:
extract a table group including a first table and at least one second table from a plurality of tables formed as images, the first table and the at least one second table having a common characteristic in terms of a table structure, the first table including a heading row representing attributes of attribute values included in the first table and the at least one second table, the at least one second table not including the heading row;
if no attribute representing a consecutiveness is included in the heading row, detect whether there is excess or shortage in the first table and the at least one second table forming the table group by using attribute values of an attribute which is included in the heading row and which represents consistency regarding excess and shortage in the first table and the at least one second table forming the table group; and
obtain attribute values corresponding to each of the attributes included in the heading row from the table group if neither excess nor shortage is detected in the first table and the at least one second table.

10. An information processing apparatus comprising:
means for extracting a table group including a first table and at least one second table from a plurality of tables formed as images, the first table and the at least one second table having a common characteristic in terms of a table structure, the first table including a heading row representing attributes of attribute values included in the first table and the at least one second table, the at least one second table not including the heading row;
means for relating the first table and the at least one second table included in the table group to each other so that rows of the first table and rows of the at least one second table are arranged in consecutive order, by using attribute values of an attribute which is included in the heading row and which represents consecutiveness of the rows of the first table and the rows of the at least one second table;
means for detecting whether there is excess or shortage in the first table and the at least one second table forming the table sequence by using attribute values of an attribute which is included in the heading row and which represents consistency regarding excess and shortage in the first table and the at least one second table forming the table sequence; and
means for obtaining attribute values corresponding to each of the attributes included in the heading row from a table sequence if neither excess nor shortage is detected in the first table and the at least one second table, whether the table sequence includes the first table and the at least one second table arranged in consecutive order.

\* \* \* \* \*